United States Patent
Dinkel et al.

(10) Patent No.: US 6,511,130 B2
(45) Date of Patent: Jan. 28, 2003

(54) HEAD RESTRAINT FOR A VEHICLE SEAT

(75) Inventors: Emil Dinkel, Renningen (DE); Vasilios Orizaris, Renningen (DE); Juergen Schrader, Weil im Schoenbuch (DE)

(73) Assignee: DaimlerChrysler AG, Stuttgart (DE)

( * ) Notice: Subject to any disclaimer, the term of this patent is extended or adjusted under 35 U.S.C. 154(b) by 44 days.

(21) Appl. No.: 09/809,434

(22) Filed: Mar. 16, 2001

(65) Prior Publication Data

US 2002/0043860 A1 Apr. 18, 2002

(30) Foreign Application Priority Data

Mar. 16, 2000 (DE) .......................................... 100 12 973

(51) Int. Cl.⁷ ................................................. A47C 7/36
(52) U.S. Cl. ........................ 297/410; 297/408; 297/409
(58) Field of Search ................................. 297/410, 408, 297/409

(56) References Cited

U.S. PATENT DOCUMENTS

| | | | | |
|---|---|---|---|---|
| 4,693,515 A | * | 9/1987 | Russo et al. ............. | 297/408 X |
| 4,856,848 A | * | 8/1989 | O'Suillivan ............. | 297/409 X |
| 5,181,763 A | * | 1/1993 | Dellanno et al. ....... | 297/408 X |
| 5,290,091 A | * | 3/1994 | Dellanno et al. ....... | 297/408 X |
| 5,364,164 A | * | 11/1994 | Kuranami ................ | 297/408 |
| 5,642,918 A | * | 7/1997 | Sakamoto et al. ........ | 297/408 |
| 5,669,666 A | * | 9/1997 | Lee ........................ | 297/408 |
| 5,738,412 A | * | 4/1998 | Aufrere et al. .......... | 297/408 |
| 5,829,838 A | * | 11/1998 | Offenbacher ............. | 297/408 |
| 5,842,738 A | * | 12/1998 | Knoll et al. ............. | 297/408 X |
| 6,033,018 A | * | 3/2000 | Fohl ....................... | 297/408 X |
| 6,045,181 A | * | 4/2000 | Ikeda et al. ............. | 297/408 |
| 6,074,010 A | * | 6/2000 | Takeda ................... | 297/408 X |
| 6,074,011 A | * | 6/2000 | Ptak et al. .............. | 297/408 |
| 6,079,776 A | * | 6/2000 | Breitner et al. ......... | 297/408 X |
| 6,199,947 B1 | * | 3/2001 | Wiklund ................. | 297/408 X |

FOREIGN PATENT DOCUMENTS

| | | |
|---|---|---|
| DE | 3404379 | 9/1985 |
| DE | 3900495 | 7/1990 |
| DE | 4305909 | 9/1994 |
| DE | 29504287.7 | 6/1995 |
| DE | 19520893 | 12/1996 |
| DE | 19722515 | 9/1998 |

* cited by examiner

Primary Examiner—Rodney B. White
(74) Attorney, Agent, or Firm—Crowell & Moring LLP

(57) ABSTRACT

A head restraint for a vehicle seat has a holding element which can be inserted into a seat backrest in a manner allowing it to be displaced vertically. A padding support is arranged on the holding element which holds a padded headrest intended for supporting the head. A pivoting device is arranged between the holding element and padding support and is intended for setting the inclination of the padded headrest about a rotational axis orientated transversely to the seat depth. In order to provide a head restraint which is anatomically shaped and can be set in height and inclination in such a manner that in every position it forms a continuation of the contour of the seat occupant's back, the padded headrest has a padded tongue which is pulled out downwards over the padding support for the purpose of supporting the back of the neck. The contour of the front surface of the padded headrest and padded tongue reproduces the profile of the back of the head and back of the neck. The pivoting device is designed so that the rotational axis of the padded headrest lies outside the head-restraint structure and, in all possible vertical settings of the head restraint, always lies on the level backrest surface.

49 Claims, 7 Drawing Sheets

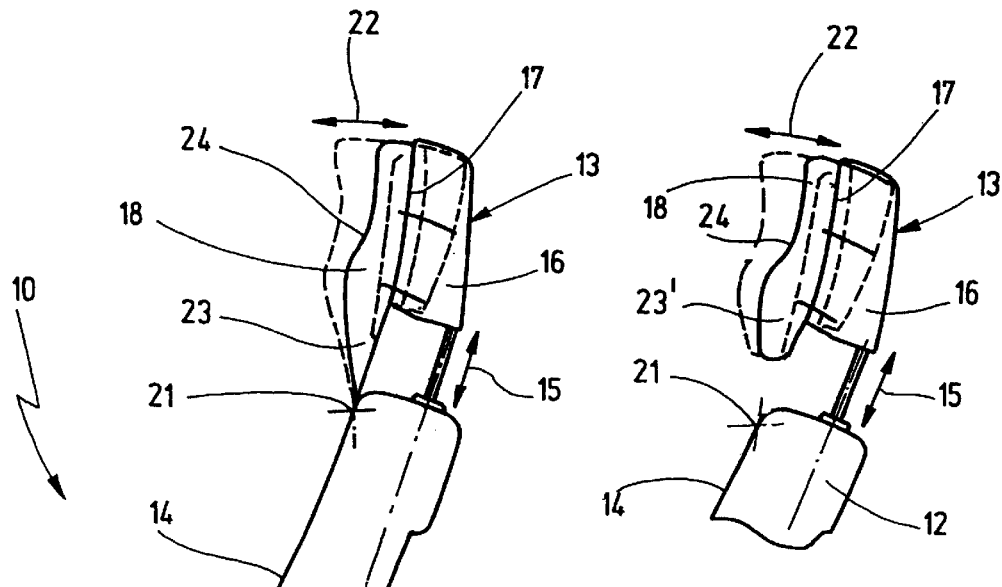
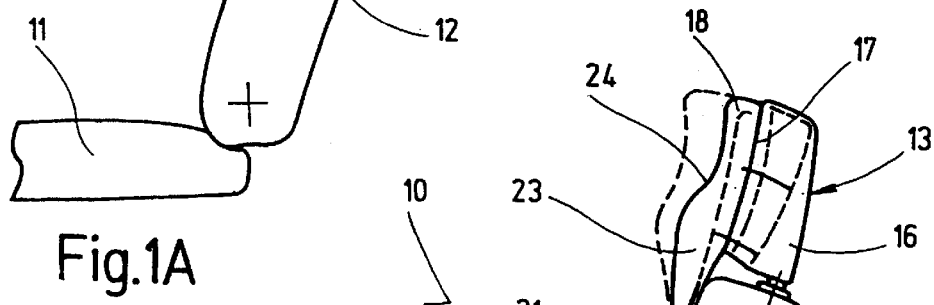
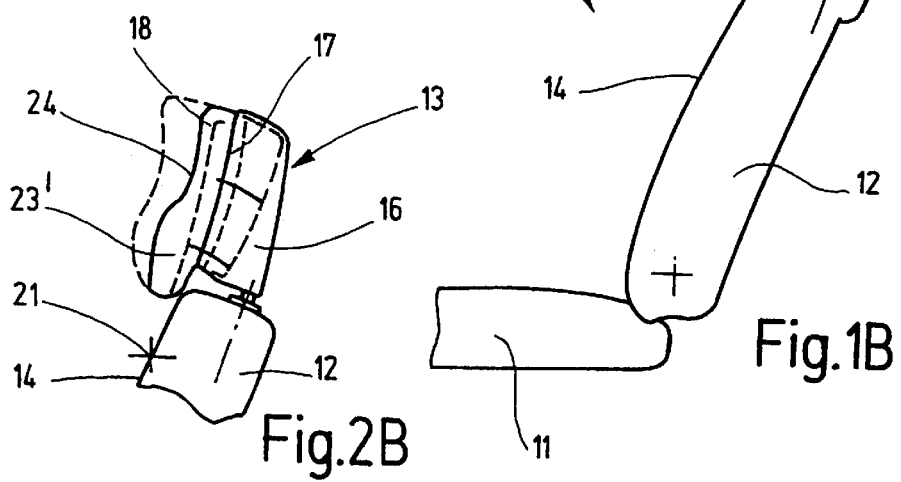
Fig.1A  Fig.1B  Fig.2A  Fig.2B

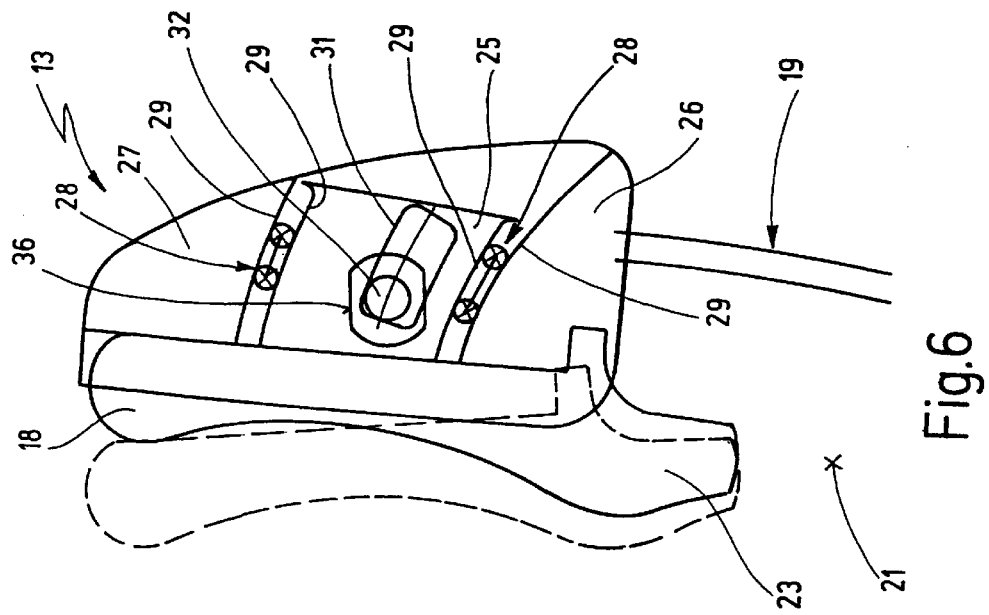
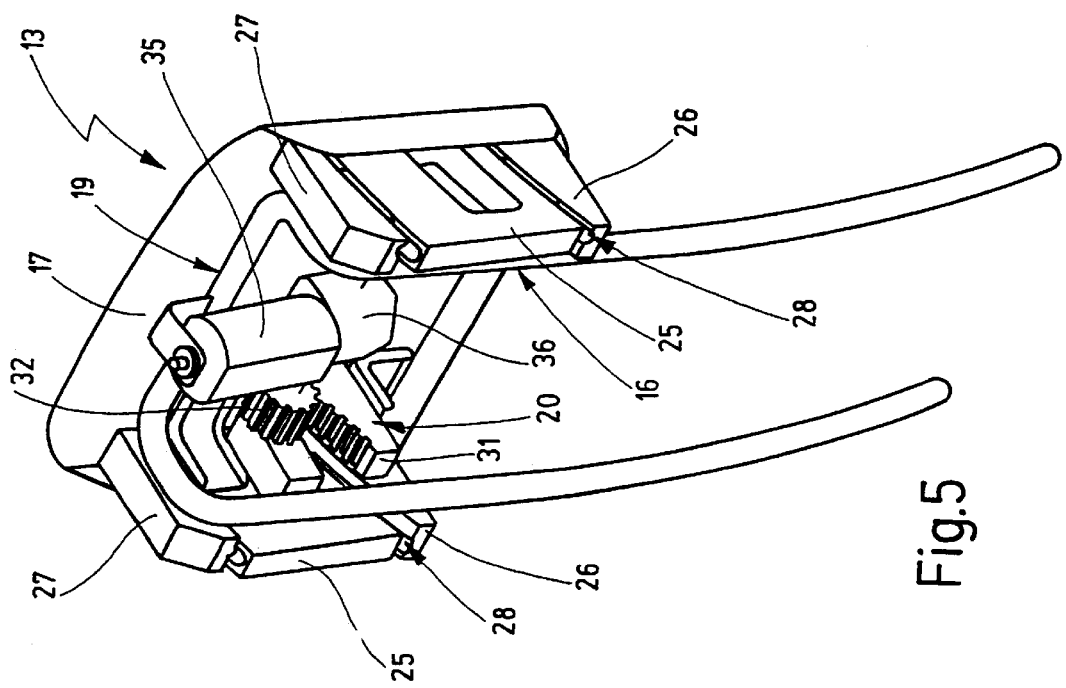

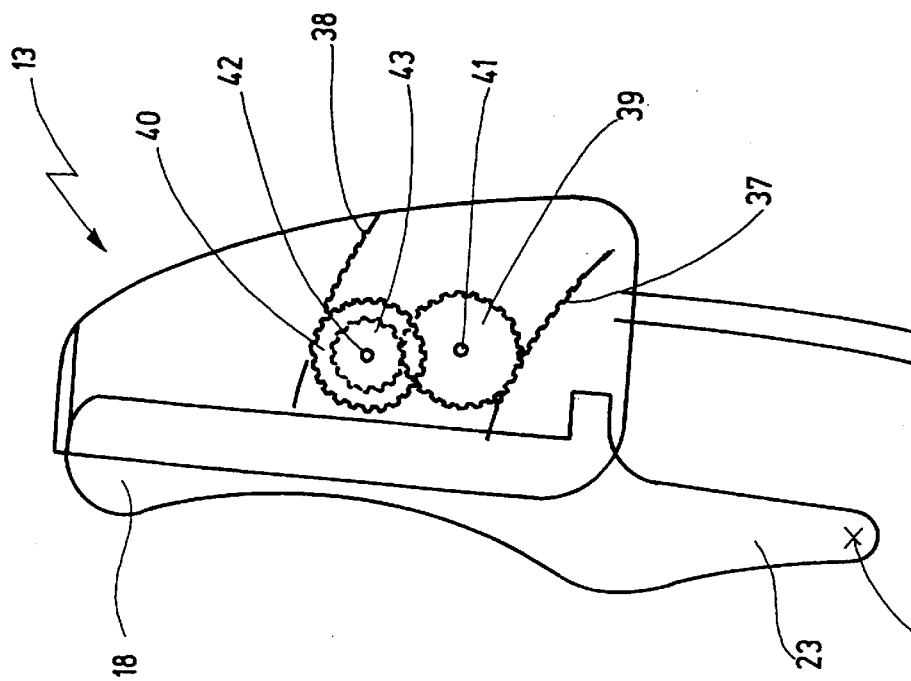
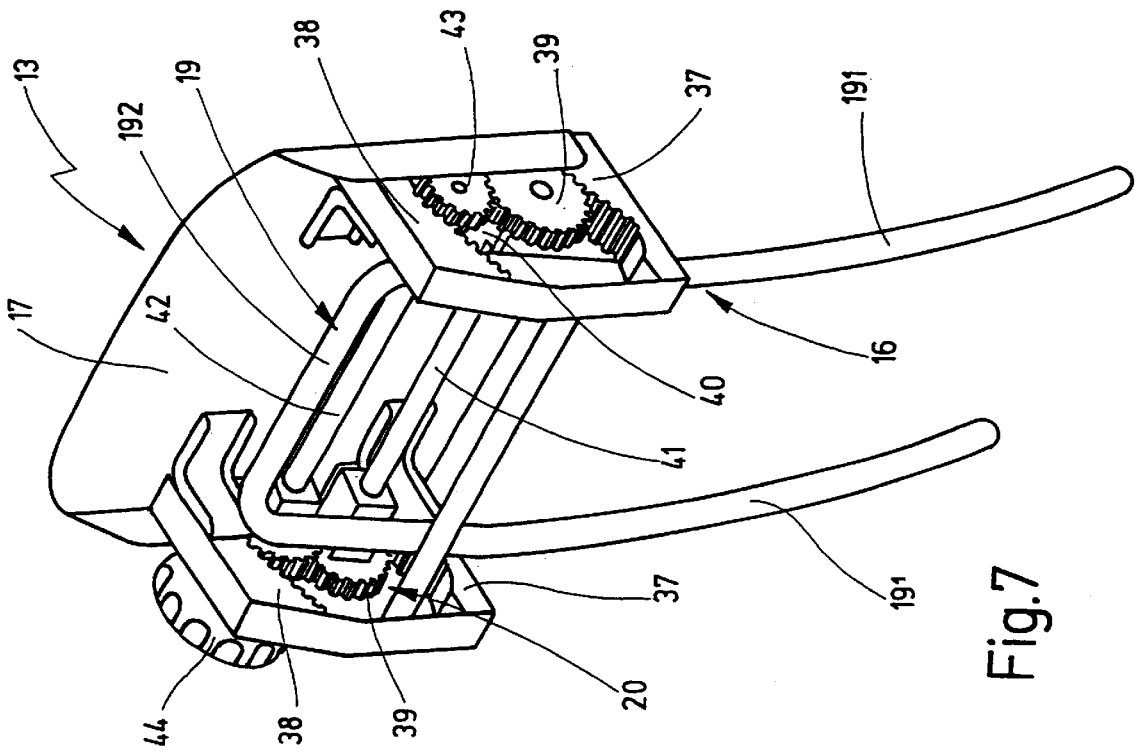

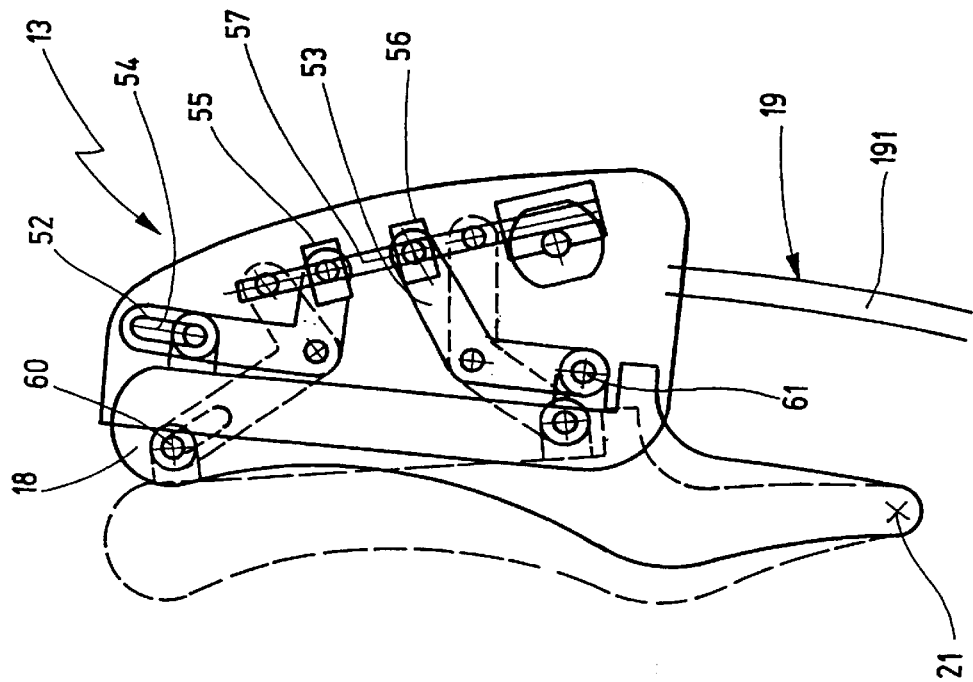
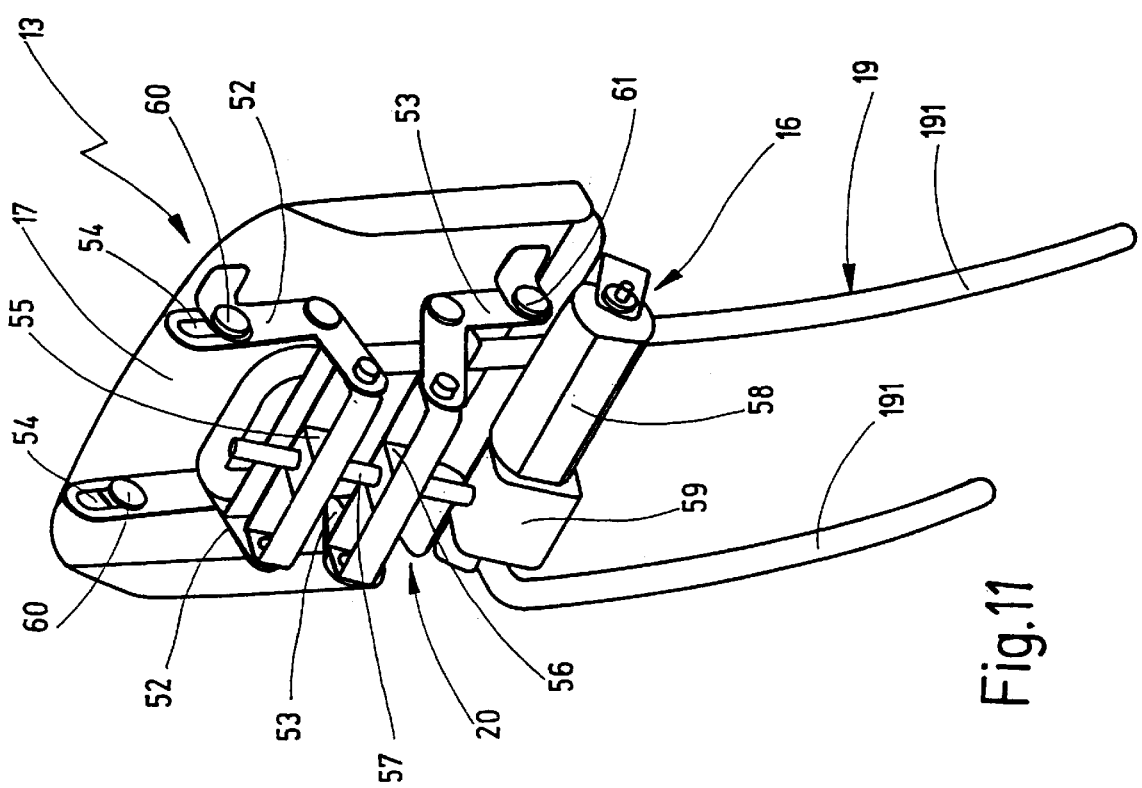

HEAD RESTRAINT FOR A VEHICLE SEAT

BACKGROUND AND SUMMARY OF THE INVENTION

This application claims the priority of German Patent Document 100 12 973.0, filed in Germany, Mar. 16, 2001, the disclosure of which is expressly incorporated by reference herein.

The invention relates to a head restraint for a vehicle seat having a seat cushion and backrest. Preferred embodiments of the invention relate to a head restraint for a vehicle seat having a seat cushion and backrest, comprising: a holding element which can be inserted into the backrest in a manner allowing it to be displaced vertically and latched in place, a padding support is arranged on the holding element, a padded headrest which is held on the padding support and is intended for supporting an occupant's head, and a pivoting device which is arranged between the holding element and padding support and is intended for inclining the padded headrest about a rotational axis orientated transversely to a seat depth.

In a known head restraint of this type (German Patent Document DE 43 05 909 C2), the holding element has a bent, U-shaped supporting bracket which is held by its legs in two guide sleeves integrated in the backrest in a manner allowing it to be displaced vertically and, on its transverse web which connects the legs, carries a rotating element of the pivoting device. The rotating element sits in an axially displaceable manner on the padding support, which is designed as a U-shaped bracket, with the result that the padded headrest is displaced horizontally and also, in each horizontal sliding position, can be tilted about a pivoting axis running through the transverse web of the supporting bracket. Thus, the padded headrest can be adapted to the height of the seat user by vertical adjustment of the supporting bracket and can be brought up to the head of the seat occupant by horizontal displacement and adjustment of the inclination.

In order to support the head of seat users who differ extremely in height, the head restraint has to be able to be adjusted over a large vertical range. This means that, on the one hand, the head restraint rests on its lower side directly on the upper edge of the backrest and, on the other hand, is at a more or less large distance from the upper edge of the backrest. In the latter case, continuous support of the upper part of the seat occupant's body, i.e. support of the shoulders, back of the neck and head, is not provided. This interruption in the continuous support of the body may firstly lead to tenseness of the muscular system of the back and back of the neck during relatively long journeys, and secondly, misadjustment, which is easily possible, of the vertical position means that the head restraint does not always provide optimum protection in the event of a crash. Many head restraints are often adjusted in such a manner that they do indeed provide good support of the back of the neck, but this results in a head restraint which is set too low and increases the risk of the neck being broken in the event of a crash. In contrast, when the height of the head restraint is set correctly, the padded headrest does not provide any support for the back of the neck.

The invention is based on the object of providing a head restraint of the type mentioned at the beginning which is anatomically shaped and can be adjusted in height and inclination in such a manner that in every position it forms a continuation of the contour of the seat occupant's back and into the region of the back of the neck and head.

According to the invention, the object is by a head restraint for a vehicle seat having a seat cushion and backrest, comprising: a holding element which can be inserted into the backrest in a manner allowing it to be displaced vertically and latched in place, a padding support is arranged on the holding element, a padded headrest which is held on the padding support and is intended for supporting an occupant's head, and a pivoting device which is arranged between the holding element and padding support and is intended for inclining the padded headrest about a rotational axis orientated transversely to a seat depth, wherein the padded headrest has a padded tongue which is integral to it and is pulled out downwards over the padding support for the purpose of supporting a back of an occupant's neck, wherein a contour of a front surface of the padded headrest and padded tongue reproduces a profile of a back of a head and back of a neck of a vehicle human occupant, and wherein the pivoting device is designed in such a manner that the rotational axis of the padded headrest lies outside the head-restraint structure and, in all intended use vertical settings of the head restraint, always lies on a front surface of the backrest facing the seat occupant.

The head restraint according to the invention has the advantage that it can always be adjusted in height and inclination in such a manner that it always realizes a continuous support for the upper part of the body in the region of the shoulders, back of the neck and head. Maximum safety and maximum comfort are interlinked here, i.e. the head restraint provides maximum safety if it is set comfortably for the seat occupant. Wrong setting is reduced to a minimum; this is because a head restraint which is set too low presses against the back and signals to the seat occupant that he/she has to set the head restraint higher. By designing the pivoting device in such a manner that the imaginary or hypothetical rotational axis always lies on the level backrest surface during pivoting of the head restraint, the best possible support of the muscular system of the back of the neck is ensured. In the event of a crash (rear or frontal impact), the head restraint according to the invention provides good support, since the impact surface is situated very close to the back of the head and the fixing device means that the impact forces are passed on directly to the backrest structure via the holding element.

Advantageous features of preferred embodiments of the head restraint according to the invention together with expedient developments and refinements of the invention are described herein and in the claims.

The pivoting movement of the padded headrest, which takes place about the pivot axis of the padded headrest lying outside the structure of the head restraint, specifically always in the region of the level backrest surface, can be executed manually or electrically, it being possible for the movement of the padded headrest, which takes place along concentric circles about the rotational axis, to be realized in the pivoting device by a gear mechanism and multiplication means or by a linkage mechanism and slotted guide. In this case, the padded headrest can be fixed in every position. When the padded headrest is pivoted by motor, the position of the head restraint can be preset automatically via mapping control, all of the seat-setting positions being taken into consideration. Automatic positioning of the head restraint may also take place by detecting the position of the occupant. The preset position may be corrected at any time by the occupant.

Other objects, advantages and novel features of the present invention will become apparent from the following detailed description of the invention when considered in conjunction with the accompanying drawings.

BRIEF DESCRIPTION OF THE DRAWINGS

FIGS. 1A and 1B show part of a side view of a vehicle seat with a head restraint constructed according to preferred embodiments of the invention placed in two extreme vertical settings, specifically for a man of the 95th percentile in FIG. 1A and for a woman of the 5th percentile in FIG. 1B, the head restraint being illustrated diagrammatically in each case;

FIGS. 2A and 2B show an identical illustration as in FIGS. 1A and 1B with a modified padded headrest for the head restraint;

FIG. 5 shows a perspective view from the rear of the head restraint in FIGS. 2A and 2B without the padded headrest;

FIG. 6 shows a diagrammatic side view of the head restraint in FIG. 5 with the padded headrest;

FIG. 7 shows an identical illustration to FIG. 3 of a head restraint according to a third exemplary embodiment;

FIG. 8 shows a diagrammatic side view of the head restraint in FIG. 7;

FIG. 11 shows an identical illustration to FIG. 3 of a head restraint according to a fifth exemplary embodiment;

FIG. 12 shows a diagrammatic side view of the head restraint in FIG. 11 with a padded headrest;

DETAILED DESCRIPTION OF THE DRAWINGS

Figure 4:
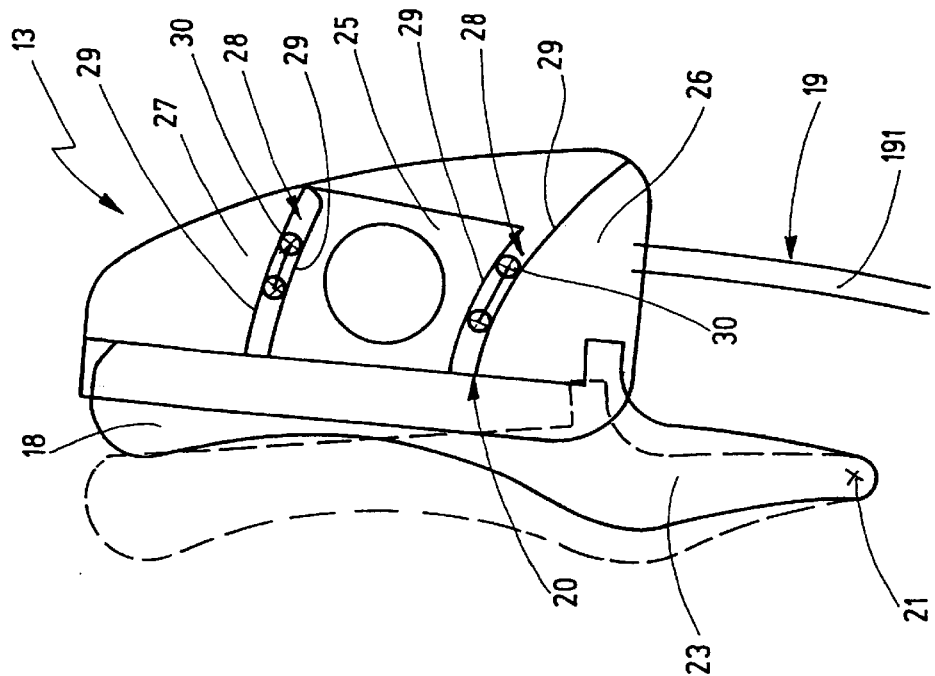
FIG. 4 shows a diagrammatic side view of the head restraint in FIG. 3 with the padded headrest.

The vehicle seat, part of which is illustrated in side view in FIGS. 1A and 1B, has a seat cushion 11, a backrest 12 which is held pivotably on the seat cushion 11, and a head restraint 13 which is held in the backrest 12 in a manner allowing it to be adjusted vertically. The front surface, facing a seat occupant, of the backrest 12, which is referred to as the level backrest surface, is denoted by 14. The vertical adjustability of the head restraint 13 is known and is indicated in FIGS. 1A and 1B by the double arrow 15.

The head restraint 13, which is merely indicated diagrammatically in FIGS. 1A and 1B comprises a holding element 16, a padding support 17 which is arranged on the holding element 16 and a padded headrest 18 which is held on the padding support 17 and is intended for supporting the seat occupant's head. As can better be seen in FIGS. 3 and 4, the holding element 16 has a U-shaped supporting bracket 19 whose two bracket legs are guided in the backrest structure of the backrest 12 in a manner allowing them to be adjusted vertically and can be latched in place in every vertical position. The bracket legs 191 are bent in the upper region and connected to each other via a transverse web 192.

A pivoting device 20 is arranged between the holding element 16 and supporting bracket 19 and padding support 17, and by means of the pivoting device the padding support 17 together with the padded headrest 18 held on it can be inclined about a rotational axis 21 orientated transversely to the seat depth and can therefore be brought up to the seat occupant's head. The pivotability of the padded headrest 18 is symbolized in FIG. 1A by a double arrow 22. The two end pivoting positions of the padded headrest 18 are shown by solid and by dashed lines.

In order to obtain an anatomically shaped head restraint which can be adjusted in height and inclination in such a manner that in every position it ensures continuous support of the upper part of the seat occupant's body, i.e. support of the shoulders, back of the neck and head, the padded headrest 18 has a padded tongue 23 which is integral to it and is pulled out downwards over the padding support 17 for the purpose of supporting the back of the neck, and the contour of the front surface 24 of the padded headrest 18 and padded tongue 23 reproduces the profile of the back of the head and neck. In addition, the pivoting device 20 is designed in such a manner that the rotational axis 21, about which the padded headrest 18 pivots together with the padded tongue 23, lies outside the head-restraint structure, specifically, in all possible vertical settings of the head restraint 13 and of the holding element 16 and the supporting bracket 19, always lies on the level backrest surface 14.

In the exemplary embodiment of the head restraint 13 in FIGS. 1A and 1B, the padded tongue 23 is pulled out downwards to a sufficient extent such that it reaches precisely as far as the upper edge of the backrest 12 when the head restraint 13 is raised to the maximum for a man of the 95th percentile (FIG. 1A). In the lowest setting of the head restraint 13 for a woman of the 5th percentile (FIG. 1B), the padded tongue 23 is then pushed to the maximum extent over the level backrest surface 14. In both cases, the rotational axis 21 lies, as before, in the region of the level backrest surface 14.

In the exemplary embodiment of the head restraint 13 in FIGS. 2A and 2B, the padded tongue 23' is of shortened design, with the result that in the lowest setting of the head restraint 13 for a woman of the 5th percentile (FIG. 2B) it reaches as far as the upper edge of the backrest 12. In the maximum vertical setting of the head restraint 13 for a man of the 95th percentile (FIG. 2A), a gap is produced between the lower edge of the padded tongue 23' and the upper edge of the backrest 12. However, as before, the rotational axis 21 of the padded headrest 18 lies on the level backrest surface 14 in both extreme positions.

FIGS. 3–14 illustrate various design variants of the pivoting device 20 in detail. Each of the pivoting devices 20 causes the padded headrest 18 to be displaced over a circular arc section which lies concentrically to the imaginary or hypothetical rotational axis 21 on the level backrest surface 14.

Figure 3:
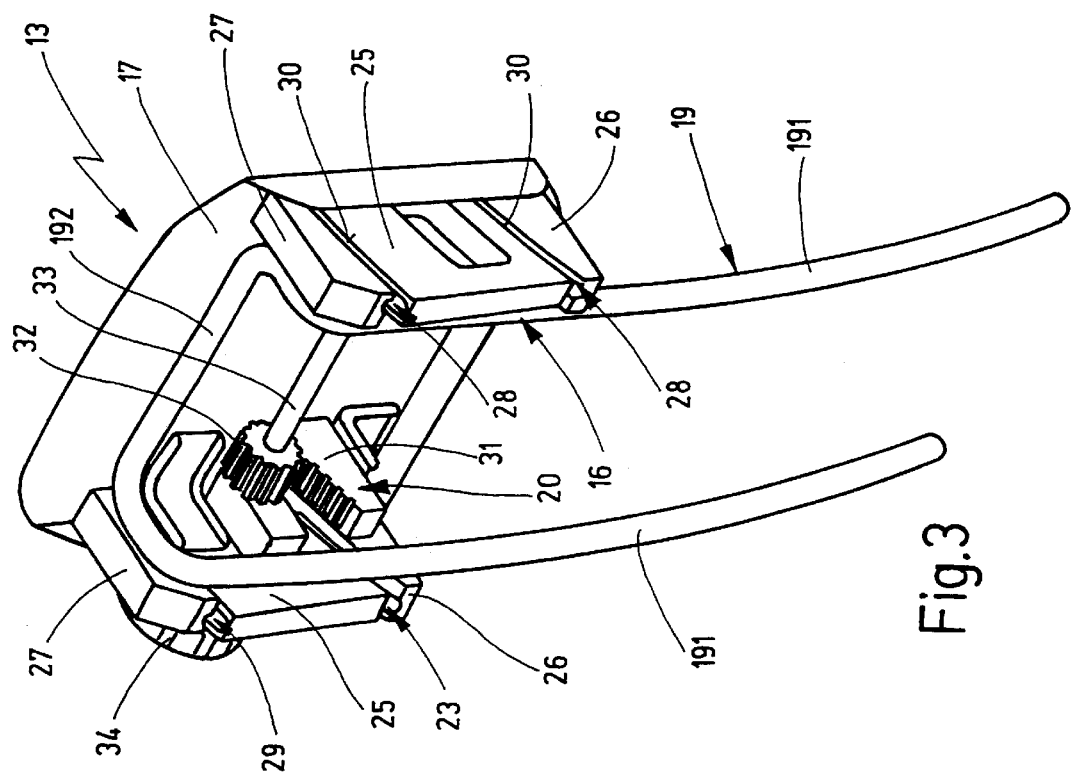
FIG. 3 shows a perspective view from the rear of the head restraint in FIGS. 1A and 1B without the padded headrest.

In the exemplary embodiment of FIGS. 3 and 4, the pivoting device 20 has two sliding elements 25 which are arranged at a transverse distance from each other and are connected fixedly to the holding element 16 and the supporting bracket 19. A lower sliding element 26 and an upper sliding element 27 are arranged above and below each sliding element 25. The sliding elements 25–27 are supported on one another via a respective sliding guide 28. The mutually facing sliding surfaces 29 of the sliding elements 25–27 are circular arc sections which lie concentrically to the rotational axis 21. In the exemplary embodiment of FIGS. 3 and 4, the sliding guides 28 have sliding bodies 30 inserted between the sliding surfaces 29. Instead of sliding bodies 30, rolling bodies may also be used or the sliding guides 28 may be designed as dovetail joints, in which case the sliding surfaces 29 rest directly on one another.

Furthermore, a toothed-ring segment 31, which likewise lies coaxially to the rotational axis 21, is fastened to the padding support 17. Meshing with the toothed-ring segment 31 is a toothed wheel 32 which sits in a rotationally fixed manner on a toothed-wheel shaft 33 held rotatably in the holding element 16. Also sitting on the toothed-wheel shaft 33 in a rotationally fixed manner is a handwheel 34 which protrudes laterally on the outside of the holding element 16. If the handwheel 34 in FIG. 3 is rotated in the clockwise direction, the toothed wheel 32 rolls along the toothed-ring segment 31 and displaces the latter, as a result of which the padding support 17 is pivoted together with the padded headrest 18 into the position shown by dashed lines in FIG. 4.

The pivoting device 20 illustrated in FIGS. 5 and 6 corresponds entirely to the pivoting device 20 described in FIGS. 3 and 4 except that the toothed-wheel shaft 33 is not rotated manually using the handwheel 34, but by motor. For this purpose, an electric motor 35, which rotates the toothed-wheel shaft 33 via an angular gear 36, is fastened to the holding element 16. Thus, in the same manner as described above, the padding support 17 is transferred together with the padded headrest 18 from the position indicated by solid lines in FIG. 6 into the position illustrated by dashed lines in FIG. 6. In the case of the padded headrest 18 illustrated in FIG. 6, a change has also been undertaken to the extent that the padded tongue 23' is of shortened design, corresponding to the head restraint according to FIG. 2, with the result that the hypothetical rotational axis 21, about which the padded headrest 18 is rotated, lies outside the padded tongue 23', but as before, in all vertical adjustments of the head restraint 13, always lies on the level backrest surface 14.

In the case of the two pivoting devices 20 illustrated firstly in FIGS. 3 and 4 and secondly in FIGS. 5 and 6, the fixing of the sliding elements 25, on the one hand, and of the sliding elements 26, 27, on the other hand, to the holding element 16 and padding support 17 can be interchanged.

In the exemplary embodiment of the head restraint 13 in FIGS. 7 and 8, the pivoting device 20 has two pairs of toothed segments 37, 38 which are arranged concentrically to the rotational axis 21, are spaced apart radially from one another and whose rows of teeth face one another, and also two pairs of toothed wheels 39, 40 which respectively mesh with one of the toothed segments 37, 38. The four toothed segments 37 and 38 in total are fastened to the padding support 17, while the four toothed wheels 39 and 40 in total are mounted rotatably in the holding element 16. In this case, the two toothed wheels 39 which mesh with the toothed segments 37 and the two toothed wheels 40 which mesh with the toothed segments 38 respectively sit on a common toothed-wheel shaft 41 or 42. A driving toothed wheel 43 and a handwheel 44 also sit on the toothed-wheel shaft 42. The driving wheel 43 meshes with the toothed wheel 39, with the result that when the toothed-wheel shaft 42 is rotated by means of the handwheel 44, the upper toothed wheel 40 is rotated by the toothed-wheel shaft 41 and the lower toothed wheel 39 is rotated by the driving wheel 43. When the two toothed wheels 39, 40 are rotated, the toothed segments 37, 38 are pivoted about the rotational axis 21, as a result of which the padding support 17 is displaced together with the padded headrest 18 in the same direction.

Figure 10:
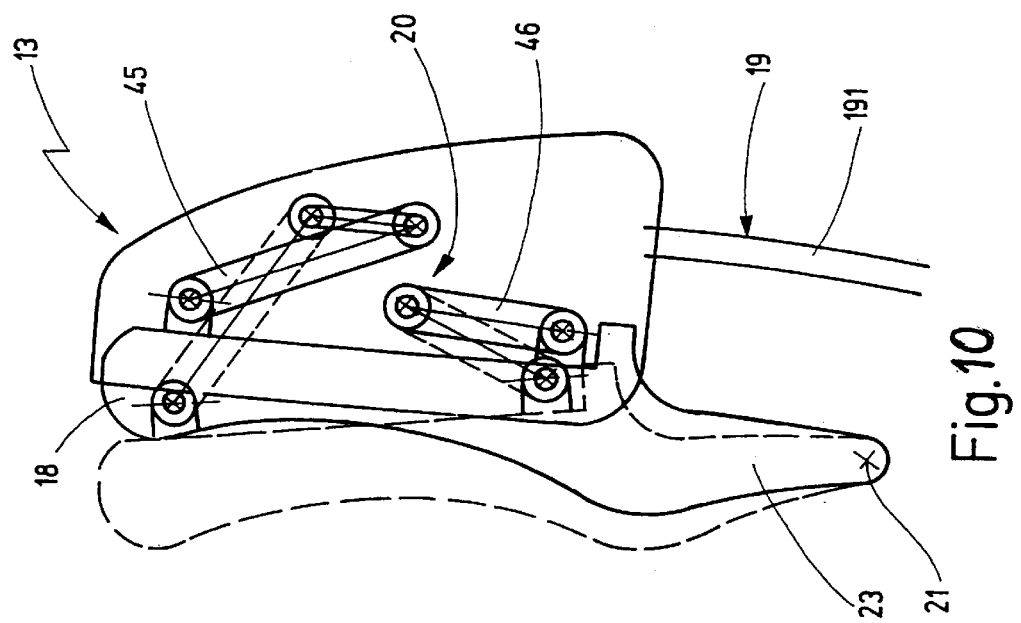
FIG. 10 shows a diagrammatic side view of the head restraint in FIG. 9 with a padded headrest.
Figure 9:
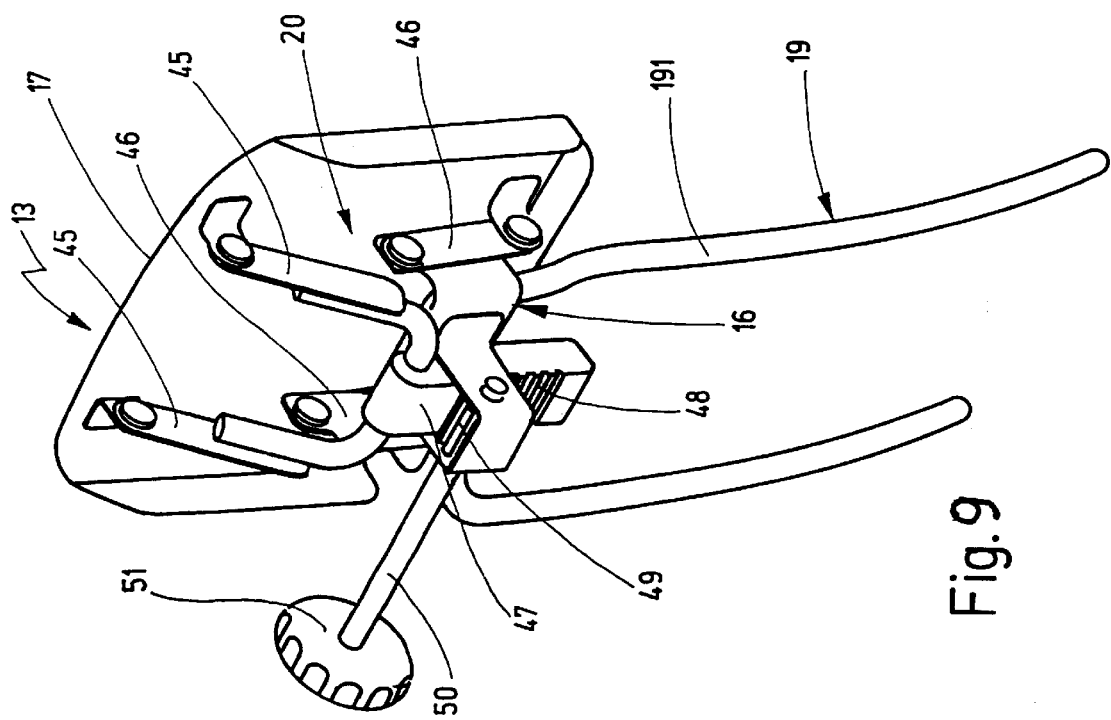
FIG. 9 shows an identical illustration to FIG. 3 of a head restraint according to a fourth exemplary embodiment.

In the exemplary embodiment of the head restraint 13 according to FIGS. 9 and 10, the pivoting of the padded headrest 18 about the imaginary rotational axis 21 is realized by means of pivoting levers which are coupled at one end to the padding support 17 and at the other end to the holding element 16. The pivoting device 20 has a pair of upper pivoting levers 45 and a pair of lower pivoting levers 46 which are arranged at a transverse distance from one another. Both pairs of pivoting levers 45, 46 are coupled to the padding support 17. The lower pair of pivoting levers 46 is additionally coupled to the holding element 16 and the upper pair of pivoting levers 45 is coupled to a lever-pivoting element 47 which is vertically displaceable in the holding element 16. The lever-pivoting element 47 has a toothing arrangement 48 and meshes with a driving pinion 49 which is seated together with a handwheel 51 on a pinion shaft 50 which is held rotatably in the holding element 16. If the handwheel 51 in FIG. 9 is rotated in the clockwise direction, the lever-pivoting element 47 is displaced vertically upwards, as a result of which the padding support 17 is pivoted forwards together with the padded headrest 18 via the pivoting-lever arrangement into the position illustrated by dashed lines in FIG. 10.

The pivoting device 20, which is arranged between the holding element 16 and padding support 17 in the exemplary embodiment of the head restraint 13 in FIG. 11 and FIG. 12, again has two pairs of pivoting levers which are arranged at a transverse spacing from one another and are designed here as angled levers 52, 53. The four angled levers 52, 53 in total are coupled by their one end to the padding support 17, the upper angled levers 52 being coupled via a respective guide 54 with an elongated slot. The other ends of the angled levers 52, 53 are respectively coupled to a threaded sleeve 55 and 56 which can be screwed onto a threaded spindle 57. The threaded spindle 57 is held rotatably on the holding element 16 and is caused to rotate by an electric motor 58 via a gear mechanism 59. The threaded spindle 57 has two threaded sections having opposite pitches, one threaded sleeve 55 or 56 in each case being screwable into one of the threaded sections. If the padded headrest 18 is in its rear end position, as is illustrated in FIG. 12 by solid lines, and if the electric motor 58 is then switched on, the threaded spindle 57 is rotated and the two threaded sleeves 55, 56 are screwed onto the threaded spindle 57 in a manner increasing the distance between the threaded sleeves 55, 56. In the process, the padding support 17 is pivoted forwards, the coupling points 60 and 61 on the padding support 17 each being displaced along a circular path which is concentric to the rotational axis 21. The maximum end pivoting position is shown in FIG. 12 by dashed lines.

Figure 14:
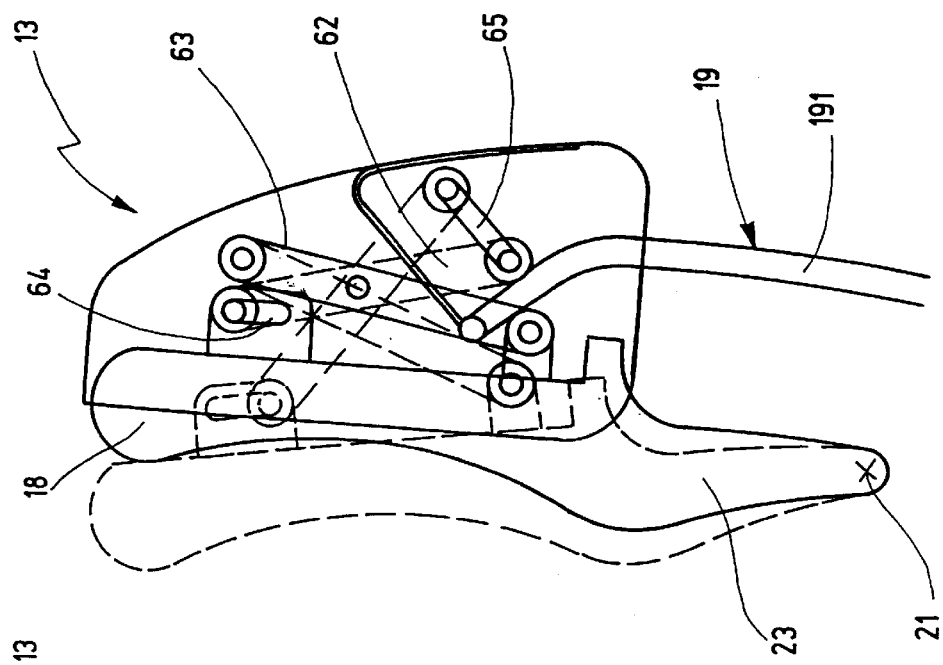
FIG. 14 shows a diagrammatic side view of the head restraint of FIG. 13 with a padded headrest.
Figure 13:
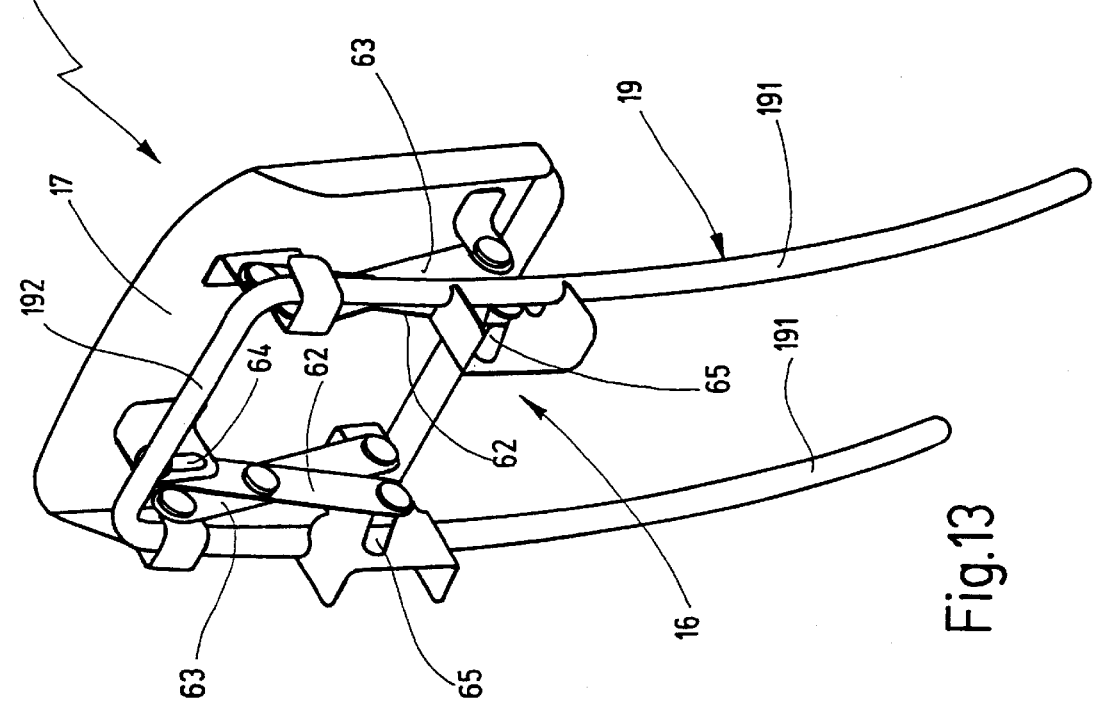
FIG. 13 shows an identical illustration to FIG. 3 of head restraint according to a sixth exemplary embodiment.

The pivoting device 20, which can be seen in the exemplary embodiment of the head restraint 13 according to FIGS. 13 and 14, has two pairs of levers 62, 63 which are connected rotatably to one another in the manner of scissors. The levers 62 are coupled at their one lever end to the padding support 17 and by their other lever end to the holding element 16. The levers 63 are connected by a respective lever end via a slotted guide 64 or 65 to the padding support 17 and holding element 16, respectively. If the padded headrest 18, which is in its rear end pivoting position, is grasped by hand and pulled forwards, it is moved by the lever kinematics and slotted guides 64, 65 about the imaginary pivot axis 21 into the position illustrated in FIG. 14 by dashed lines. The stiffness of the lever kinematics enables the set position of inclination of the padded headrest 18 to be held in each pivoting position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A head restraint for a vehicle seat having a seat cushion and backrest, comprising:
   a holding element which can be inserted into the backrest in a manner allowing it to be displaced vertically and latched in place,
   a padding support arranged on the holding element,
   a padded headrest which is held on the padding support and is intended for supporting an occupant's head, and
   a pivoting device which is arranged between the holding element and padding support and is intended for inclining the padded headrest about a rotational axis orientated transversely to a seat depth,
   wherein the padded headrest has a padded tongue which is integral to it and is pulled out downwards over the padding support for the purpose of supporting a back of an occupant's neck,
   wherein a contour of a front surface of the padded headrest and padded tongue reproduces a profile of a back of a head and back of a neck of a vehicle human occupant,
   wherein the pivoting device has at least one pair of sliding elements arranged one above the other and which can be displaced relative to one another along a circular arc section concentric to the rotational axis and of which one is fastened to the holding element and one to the padding support.

2. Head restraint according to claim 1, wherein for the relative displacement of the sliding elements, a toothed-ring segment which is concentric to the rotational axis is fixed on one sliding element and a toothed wheel which meshes with the toothed-ring segment is fixed by its toothed-wheel shaft on the other sliding element, and
   wherein the toothed-wheel shaft can be driven by means of one of a handwheel and an electric motor.

3. Head restraint according to claim 1, wherein the pivoting device is designed in such a manner that the rotational axis of the padded headrest lies outside the head-restraint structure and, in all intended use vertical settings of the head restraint, always lies on a front surface of the backrest facing the seat occupant.

4. Head restraint according to claim 1, wherein the sliding elements have, on mutually facing sides, sliding surfaces which are in the form of a circular arc section, are arranged concentrically to the rotational axis and are supported on one another via rolling bodies.

5. Head restraint according to claim 1, wherein the sliding elements have, on mutually facing sides, sliding surfaces which are in the form of a circular arc section, are arranged concentrically to the rotational axis and are supported on one another via sliding bodies.

6. Head restraint according to claim 1, wherein the pivoting device includes a second pair of sliding elements, and wherein the two pairs of sliding elements are spaced transversely from one another.

7. Head restraint according to claim 6, wherein at least one of the pairs of sliding elements have, on mutually facing sides, sliding surfaces which are in the form of a circular arc section, are arranged concentrically to the rotational axis and are supported on one another via rolling bodies.

8. Head restraint according to claim 6, wherein at least one of the pairs of sliding elements have, on mutually facing sides, sliding surfaces which are in the form of a circular arc section, are arranged concentrically to the rotational axis and are supported on one another via sliding bodies.

9. Head restraint according to claim 6, wherein at least one of the pairs of sliding elements have, on mutually facing sides, sliding surfaces which are in the form of a circular arc section, are arranged concentrically to the rotational axis and are supported on one another directly.

10. Head restraint according to claim 9, wherein one sliding element of the at least one of the pairs of sliding elements, on a side facing away from the other sliding element, is supported by way of a further sliding surface arranged concentrically to the rotational axis on an identically formed sliding surface of a further sliding element directly, and
    wherein the further sliding element is connected fixedly to the other sliding element via one of the padding support and the holding element.

11. Head restraint according to claim 9, wherein one sliding element of the at least one of the pairs of sliding elements, on a side facing away from the other sliding element, is supported by way of a further sliding surface arranged concentrically to the rotational axis on an identically formed sliding surface of a further sliding element via rolling bodies, and
    wherein the further sliding element is connected fixedly to the other sliding element via one of the padding support and the holding element.

12. Head restraint according to claim 9, wherein one sliding element of the at least one of the pairs of sliding elements, on a side facing away from the other sliding element, is supported by way of a further sliding surface arranged concentrically to the rotational axis on an identically formed sliding surface of a further sliding element via sliding bodies, and
    wherein the further sliding element is connected fixedly to the other sliding element via one of the padding support and the holding element.

13. Head restraint according to claim 1, wherein the sliding elements have, on mutually facing sides, sliding surfaces which are in the form of a circular arc section, are arranged concentrically to the rotational axis and are supported on one another directly.

14. Head restraint according to claim 13, wherein one of the sliding elements, on a side facing away from the other sliding element, is supported by way of a further sliding surface arranged concentrically to the rotational axis on an identically formed sliding surface of a further sliding element directly, and
    wherein the further sliding element is connected fixedly to the other sliding element via one of the padding support and the holding element.

15. Head restraint according to claim 14, wherein for the relative displacement of the sliding elements, a toothed-ring segment which is concentric to the rotational axis is fixed on one sliding element and a toothed wheel which meshes with the toothed-ring segment is fixed by its toothed-wheel shaft on the other sliding element, and
    wherein the toothed-wheel shaft can be driven by means of one of a handwheel and an electric motor.

16. Head restraint according to claim 13, wherein for the relative displacement of the sliding elements, a toothed-ring segment which is concentric to the rotational axis is fixed on one sliding element and a toothed wheel which meshes with the toothed-ring segment is fixed by its toothed-wheel shaft on the other sliding element, and
    wherein the toothed-wheel shaft can be driven by means of one of a handwheel and an electric motor.

17. Head restraint according to claim 13, wherein one of the sliding elements, on a side facing away from the other sliding element, is supported by way of a further sliding surface arranged concentrically to the rotational axis on an identically formed sliding surface of a further sliding element via rolling bodies, and wherein the further sliding element is connected fixedly to the other sliding element via one of the padding support and the holding element.

18. Head restraint according to claim 13, wherein one of the sliding elements, on a side facing away from the other sliding element, is supported by way of a further sliding surface arranged concentrically to the rotational axis on an identically formed sliding surface of a further sliding element via sliding bodies, and wherein the further sliding element is connected fixedly to the other sliding element via one of the padding support and the holding element.

19. A head restraint for a vehicle seat having a seat cushion and backrest, comprising:

a holding element which can be inserted into the backrest in a manner allowing it to be displaced vertically and latched in place, a padding support arranged on the holding element, a padded headrest which is held on the padding support and is intended for supporting an occupant's head, and a pivoting device which is arranged between the holding element and padding support and is intended for inclining the padded headrest about a rotational axis orientated transversely to a seat depth, wherein the padded headrest has a padded tongue which is integral to it and is pulled out downwards over the padding support for the purpose of supporting a back of an occupant's neck, wherein a contour of a front surface of the padded headrest and padded tongue reproduces a profile of a back of a head and back of a neck of a vehicle human occupant, wherein the pivoting device has at least one toothed-ring segment which is arranged concentrically to the rotational axis and a toothed wheel which meshes with the toothed-ring segment and of which one is fastened to the padding support and one to the holding element, and wherein the at least one toothed wheel can be driven by one of a handwheel and an electric motor.

20. Head restraint according to claim 19, wherein the toothed-ring segment and the toothed wheel are each present in duplicate and are arranged at a transverse distance from one another.

21. Head restraint according to claim 19, wherein the pivoting device is designed in such a manner that the rotational axis of the padded headrest lies outside the head-restraint structure and, in all intended use vertical settings of the head restraint, always lies on a front surface of the backrest facing the seat occupant.

22. A head restraint for a vehicle seat having a seat cushion and backrest, comprising:

a holding element which can be inserted into the backrest in a manner allowing it to be displaced vertically and latched in place, a padding support arranged on the holding element, a padded headrest which is held on the padding support and is intended for supporting an occupant's head, and a pivoting device which is arranged between the holding element and padding support and is intended for inclining the padded headrest about a rotational axis orientated transversely to a seat depth, wherein the padded headrest has a padded tongue which is integral to it and is pulled out downwards over the padding support for the purpose of supporting a back of an occupant's neck, wherein a contour of a front surface of the padded headrest and padded tongue reproduces a profile of a back of a head and back of a neck of a vehicle human occupant, wherein the pivoting device has at least one pair of toothed-ring segments which are arranged at a radial distance from one another concentrically to the rotational axis and whose rows of teeth face one another, and at least one pair of toothed wheels which respectively mesh with one of the toothed-ring segments, are respectively seated on a toothed-wheel shaft and of which one pair of toothed-ring segments is fixed on one of the padding support and the holding element and one pair of toothed wheels is fixed by their toothed-wheel shafts to the other of the padding support and the holding element, wherein there is arranged in a rotationally fixed manner on the toothed-wheel shaft of the one toothed wheel a driving toothed wheel which meshes with the other toothed wheel, and wherein the toothed-wheel shaft carrying the driving wheel can be driven by one of a handwheel and an electric motor.

23. Head restraint according to claim 22, wherein the toothed segments and the toothed wheels are each present in duplicate and are arranged at a transverse distance from one another.

24. Head restraint according to claim 22, wherein the pivoting device is designed in such a manner that the rotational axis of the padded headrest lies outside the head-restraint structure and, in all intended use vertical settings of the head restraint, always lies on a front surface of the backrest facing the seat occupant.

25. A head restraint for a vehicle seat having a seat cushion and backrest, comprising:

a holding element which can be inserted into the backrest in a manner allowing it to be displaced vertically and latched in place, a padding support arranged on the holding element, a padded headrest which is held on the padding support and is intended for supporting an occupant's head, and a pivoting device which is arranged between the holding element and padding support and is intended for inclining the padded headrest about a rotational axis orientated transversely to a seat depth, wherein the padded headrest has a padded tongue which is integral to it and is pulled out downwards over the padding support for the purpose of supporting a back of an occupant's neck, wherein a contour of a front surface of the padded headrest and padded tongue reproduces a profile of a back of a head and back of a neck of a vehicle human occupant, wherein the pivoting device has at least one upper and at least one lower pivoting lever which are each coupled on the end side to the holding element and padding support, and wherein at least one lever can be pivoted by one of manually and by motor.

26. Head restraint according to claim 25, wherein the pivoting device is designed in such a manner that the rotational axis of the padded headrest lies outside the head-restraint structure and, in all intended use vertical settings of the head restraint, always lies on a front surface of the backrest facing the seat occupant.

27. Head restraint according to claim 25, wherein the at least one upper lever is coupled to a lever-pivoting element which is vertically displaceable on the holding element and can be displaced by one of manually and by motor.

28. Head restraint according to claim 27, wherein the lever-pivoting element has a toothing arrangement and a driving pinion which meshes with the toothing arrangement is fixed in a rotatable manner by its pinion shaft to the holding element, and
wherein the pinion shaft can be driven by means of one of a handwheel and an electric motor.

29. Head restraint according to claim 28, wherein the upper and lower pivoting levers are each present in pairs and are arranged at a transverse distance from one another.

30. Head restraint according to claim 27, wherein the upper and lower pivoting levers are each present in pairs and are arranged at a transverse distance from one another.

31. Head restraint according to claim 25, wherein the coupling of the pivoting levers on the holding-element side is undertaken at a respective threaded sleeve,
wherein the threaded sleeves can be screwed onto threaded sections having opposed thread pitches on a threaded spindle which is fixed to the holding element, and
wherein the threaded spindle can be driven by means of one of manually and an electric motor.

32. Head restraint according to claim 31, wherein the coupling of the at least one upper lever is undertaken via a guide with an elongated slot.

33. Head restraint according to claim 32, wherein the pivoting levers are designed as angled levers.

34. Head restraint according to claim 32, wherein the upper and lower pivoting levers are each present in pairs and are arranged at a transverse distance from one another.

35. Head restraint according to claim 31, wherein the pivoting levers are designed as angled levers.

36. Head restraint according to claim 35, wherein the upper and lower pivoting levers are each present in pairs and are arranged at a transverse distance from one another.

37. Head restraint according to claim 31, wherein the upper and lower pivoting levers are each present in pairs and are arranged at a transverse distance from one another.

38. Head restraint according to claim 25, wherein the upper and lower pivoting levers are each present in pairs and are arranged at a transverse distance from one another.

39. A head restraint for a vehicle seat having a seat cushion and backrest, comprising:
a holding element which can be inserted into the backrest in a manner allowing it to be displaced vertically and latched in place,
a padding support arranged on the holding element,
a padded headrest which is held on the padding support and is intended for supporting an occupant's head, and
a pivoting device which is arranged between the holding element and padding support and is intended for inclining the padded headrest about a rotational axis orientated transversely to a seat depth,
wherein the padded headrest has a padded tongue which is integral to it and is pulled out downwards over the padding support for the purpose of supporting a back of an occupant's neck,
wherein a contour of a front surface of the padded headrest and padded tongue reproduces a profile of a back of a head and back of a neck of a vehicle human occupant,
wherein the pivoting device has at least one pair of levers which are hinged to one another and of which one is coupled on an end side to the holding element at one end and to the padding support at the other end and the other is coupled on an end side via a respective slotted guide to the holding element at one end and to the padding support at the other end.

40. Head restraint according to claim 39, wherein two of said pairs of levers are provided which are arranged at a transverse distance from one another.

41. Head restraint according to claim 39, wherein the pivoting device is designed in such a manner that the rotational axis of the padded headrest lies outside the head-restraint structure and, in all intended use vertical settings of the head restraint, always lies on a front surface of the backrest facing the seat occupant.

42. A vehicle seat head restraint adapted to be vertically adjustable in use with respect to a vehicle seat backrest, comprising:
a padded headrest operable to support a vehicle occupant's head, and
a pivoting device operable for adjustably inclining the padded headrest with pivotal movement about a pivot axis extending transversely of a seat backrest,
wherein the padded headrest includes a downwardly extending padded tongue contoured to support an occupant's neck when the padded headrest engages an occupant's head,
wherein the pivoting device has at least one toothed-ring segment which is arranged concentrically to the pivot axis and a toothed wheel which meshes with the toothed-ring segment,
wherein the at least one toothed wheel can be driven by one of a handwheel and an electric motor.

43. A vehicle seat head restraint adapted to be vertically adjustable in use with respect to a vehicle seat backrest, comprising:
a padded headrest operable to support a vehicle occupant's head, and
a pivoting device operable for adjustably inclining the padded headrest with pivotal movement about a pivot axis extending transversely of a seat backrest,
wherein the padded headrest includes a downwardly extending padded tongue contoured to support, an occupant's neck when the padded headrest engages an occupant's head,
wherein the pivoting device has at least one pair of toothed-ring segments which are arranged at a radial distance from one another concentrically to the pivot axis and whose rows of teeth face one another, and at least one pair of toothed wheels which respectively mesh with one of the toothed-ring segments, are respectively seated on a toothed-wheel shaft,
wherein there is arranged in a rotationally fixed manner on the toothed-wheel shaft of the one toothed wheel a driving toothed wheel which meshes with the other toothed wheel, and
wherein the toothed-wheel shaft carrying the driving wheel can be driven by one of a handwheel and an electric motor.

44. A vehicle seat head restraint adapted to be vertically adjustable in use with respect to a vehicle seat backrest, comprising:
a padded headrest operable to support a vehicle occupant's head, and a pivoting device operable for adjustably inclining the padded headrest with pivotal movement about a pivot axis extending transversely of a seat backrest, wherein the padded headrest includes a downwardly extending padded tongue contoured to support an occupant's neck when the padded headrest engages an occupant's head, wherein the pivoting device has at least one upper and at least one lower pivoting lever, and wherein at least one lever can be pivoted by one of manually and by motor.

45. A vehicle seat head restraint adapted to be vertically adjustable in use with respect to a vehicle seat backrest, comprising:

a padded headrest operable to support a vehicle occupant's head, and a pivoting device operable for adjustably inclining the padded headrest with pivotal movement about a pivot axis extending transversely of a seat backrest, wherein the padded headrest includes a downwardly extending padded tongue contoured to support an occupant's neck when the padded headrest engages an occupant's head, wherein the pivoting device has at least one pair of levers which are hinged to one another and are coupled to the padded headrest via a slotted guide of the padded headrest.

46. A vehicle seat assembly comprising:

a seat cushion, a seat backrest extending upwardly at a back side of the seat cushion, a head restraint carried by and vertically adjustable with respect to the backrest and including a padded headrest, and a pivoting device operable for adjustably inclining the padded headrest with pivotal movement about a pivot axis extending transversely of the seat backrest, wherein the padded headrest includes a downwardly extending padded tongue contoured to support an occupant's neck when the padded headrest engages an occupant's head, and wherein the pivoting device has at least one toothed-ring segment which is arranged concentrically to the pivot axis and a toothed wheel which meshes with the toothed-ring segment, wherein the at least one toothed wheel can be driven by one of a handwheel and an electric motor.

47. A vehicle seat assembly comprising:

a seat cushion, a seat backrest extending upwardly at a back side of the seat cushion, a head restraint carried by and vertically adjustable with respect to the backrest and including a padded headrest, and a pivoting device operable for adjustably inclining the padded headrest with pivotal movement about a pivot axis extending transversely of the seat backrest, wherein the padded headrest includes a downwardly extending padded tongue contoured to support an occupant's neck when the padded headrest engages an occupant's head, and wherein the pivoting device has at least one pair of toothed-ring segments which are arranged at a radial distance from one another concentrically to the pivot axis and whose rows of teeth face one another, and at least one pair of toothed wheels which respectively mesh with one of the toothed-ring segments, are respectively seated on a toothed-wheel shaft, wherein there is arranged in a rotationally fixed manner on the toothed-wheel shaft of the one toothed wheel a driving toothed wheel which meshes with the other toothed wheel, and wherein the toothed-wheel shaft carrying the driving wheel can be driven by one of a handwheel and an electric motor.

48. A vehicle seat assembly comprising:

a seat cushion, a seat backrest extending upwardly at a back side of the seat cushion, a head restraint carried by and vertically adjustable with respect to the backrest and including a padded headrest, and a pivoting device operable for adjustably inclining the padded headrest with pivotal movement about a pivot axis extending transversely of the seat backrest, wherein the padded headrest includes a downwardly extending padded tongue contoured to support an occupant's neck when the padded headrest engages an occupant's head, and wherein the pivoting device has at least one upper and at least one lower pivoting lever, and wherein at least one lever can be pivoted by one of manually and by motor.

49. A vehicle seat assembly comprising:

a seat cushion, a seat backrest extending upwardly at a back side of the seat cushion, a head restraint carried by and vertically adjustable with respect to the backrest and including a padded headrest, and a pivoting device operable for adjustably inclining the padded headrest with pivotal movement about a pivot axis extending transversely of the seat backrest, wherein the padded headrest includes a downwardly extending padded tongue contoured to support an occupant's neck when the padded headrest engages an occupant's head, and wherein the pivoting device has at least one pair of levers which are hinged to one another and are coupled to the padded headrest via a slotted guide of the padded headrest.

* * * * *